(12) United States Patent
Steele et al.

(10) Patent No.: US 11,050,572 B2
(45) Date of Patent: Jun. 29, 2021

(54) SYSTEMS AND METHODS FOR A DECENTRALIZED DATA AUTHENTICATION PLATFORM

(71) Applicant: Transmute Industries, Inc., Austin, TX (US)

(72) Inventors: Orie Steele, Austin, TX (US); Margo Johnson, Austin, TX (US); Karyl Fowler, Austin, TX (US); Guillaume Dardelet, Toulouse (FR)

(73) Assignee: Transmute Industries, Inc., Austin, TX (US)

( * ) Notice: Subject to any disclaimer, the term of this patent is extended or adjusted under 35 U.S.C. 154(b) by 0 days.

(21) Appl. No.: 16/905,040

(22) Filed: Jun. 18, 2020

(65) Prior Publication Data
US 2020/0403805 A1    Dec. 24, 2020

Related U.S. Application Data

(60) Provisional application No. 62/863,154, filed on Jun. 18, 2019.

(51) Int. Cl.
*H04L 9/32* (2006.01)
*H04L 9/30* (2006.01)
(Continued)

(52) U.S. Cl.
CPC ............ *H04L 9/3247* (2013.01); *G06F 9/547* (2013.01); *G06F 21/602* (2013.01); *H04L 9/30* (2013.01); *H04L 9/3242* (2013.01)

(58) Field of Classification Search
CPC ....... H04L 9/3247; H04L 9/30; H04L 9/3242; H04L 63/08; H04L 63/083; H04L 9/0825;
(Continued)

(56) References Cited

U.S. PATENT DOCUMENTS

| 10,248,798 B1 | 4/2019 | Jayakumar et al. |
| 10,664,797 B2 | 5/2020 | Chappell et al. |

(Continued)

FOREIGN PATENT DOCUMENTS

| WO | WO 2007/079595 A1 | 7/2007 |
| WO | WO 2017/066618 A1 | 4/2017 |
| WO | 2019/018278 A1 | 1/2019 |

OTHER PUBLICATIONS

International Search Report and Written Opinion for PCT App. No. PCT/US2020/038459 dated Sep. 25, 2020.

*Primary Examiner* — Shanto Abedin
(74) *Attorney, Agent, or Firm* — Waller Lansden Dortch & Davis LLP; Blake M. Bernard; Christopher T. McNeill

(57) ABSTRACT

A computer-implemented method for creating authenticable data may include receiving, at a computer server, a credential; storing, in a first data storage, the credential; and generating a credential decentralized identifier (DID) document. The credential DID document may correspond to the credential. The method may further include obtaining a first digital signature, which may be verifiable via a first public cryptographic key. A first attesting DID document may include the first public cryptographic key. The method may further include storing, in the first data storage, the first digital signature; and modifying the first attesting DID document to include a link configured to provide data access to data stored at first location in the first data storage. The data stored at the first location in the first data storage may include the credential or the first digital signature. The method may include obtaining a verifiable credential.

20 Claims, 8 Drawing Sheets

(51) Int. Cl.
*G06F 21/60* (2013.01)
*G06F 9/54* (2006.01)

(58) Field of Classification Search
CPC ... H04L 2209/38; G06F 9/547; G06F 21/602; G06F 16/185
See application file for complete search history.

(56) References Cited

U.S. PATENT DOCUMENTS

| | | | | |
|---|---|---|---|---|
| 2016/0283920 | A1* | 9/2016 | Fisher | H04L 9/3297 |
| 2017/0078095 | A1 | 3/2017 | Iyer et al. | |
| 2017/0109759 | A1* | 4/2017 | Korb | G06Q 30/018 |
| 2017/0206532 | A1* | 7/2017 | Choi | G06Q 30/02 |
| 2017/0230361 | A1* | 8/2017 | Toth | H04L 63/0823 |
| 2018/0082256 | A1* | 3/2018 | Tummuru | G06Q 10/1053 |
| 2019/0213333 | A1* | 7/2019 | Williams | G06F 21/64 |
| 2019/0230092 | A1* | 7/2019 | Patel | G06F 16/907 |
| 2019/0312734 | A1* | 10/2019 | Wentz | H04L 9/3247 |
| 2019/0333054 | A1* | 10/2019 | Cona | H04W 12/00518 |
| 2020/0067907 | A1* | 2/2020 | Avetisov | H04L 9/3218 |
| 2020/0111118 | A1* | 4/2020 | Patel | H04L 9/0894 |
| 2020/0211409 | A1* | 7/2020 | Latorre | G09B 19/00 |
| 2020/0213124 | A1* | 7/2020 | Castinado | H04L 9/3247 |
| 2020/0244470 | A1* | 7/2020 | Ruckriemen | H04L 9/3236 |

* cited by examiner

```
{
    "@context": "https://www.w3.org/ns/did/v1",
    "id": "did:example:credential123",
    "authentication": [{
        "id": "did:example:credential123#keys-1",
        "type": "Ed25519VerificationKey2018",
        "publicKey": "H3C2AVvLMv6gmMNam3uVAjZpf"
    }],
    "service": [{
        "id":"did:example:credential123#vcs",
        "type": "VerifiableCredentialService",
        "serviceEndpoint":
        "https://example.com/edv/credential123#E265B6F564601A1FE"
    }]
}
```

400

410 — `"id": "did:example:credential123"`
420 — `"authentication": [{`
430 — `"service": [{`
432 — `"https://example.com/edv/credential123#E265B6F564601A1FE"`
434 — `"serviceEndpoint":`

FIG. 4

Attest to Lumber Report — 502

Purchase Details: 504(1)

Purchase Order: PO 538   Invoice Number: IN 788   Certificate Number: CT 003 — 504(2), 504(3)

Shipping Details: 504(4)

License Number: L 4572   Master Bill of Lading: MBL 451   Container Number: MBL 451 — 504(5), 504(6)

Lumber Properties: ← 506

| Number | Quantity | Dimensions | Weight | Type |
|---|---|---|---|---|
| 00458 | 4 | 2"x4"x16' | 2.36 kg | Spruce |
| 00387 | 6 | 8"x8"x10' | 4.2 kg | Cedar |

508 — Sign Credential

FIG. 5

View Verified Lumber Report

Purchase Details: 604(1)

Purchase Order: PO 538    Invoice Number: IN 788    Certificate Number: CT 003

Shipping Details: 604(4)

License Number: L 4572    Master Bill of Lading: MBL 451    Container Number: MBL 451

Lumber Properties: 606

| Number | Quantity | Dimensions | Weight | Type |
|--------|----------|------------|--------|------|
| 00458  | 4        | 2"x4"x16'  | 2.36 kg | Spruce |
| 00387  | 6        | 8"x8"x10'  | 4.2 kg  | Cedar |

Attested by: Imperial Mfg., Fonseca Shipping, U.S.C.P.B.    [View Signatures]

FIG. 6

SYSTEMS AND METHODS FOR A DECENTRALIZED DATA AUTHENTICATION PLATFORM

CROSS-REFERENCES TO RELATED APPLICATIONS

This application claims priority to U.S. Provisional Patent Application No. 62/863,154, entitled "Systems and Methods for a Decentralized Identity Platform," filed Jun. 18, 2019, the entirety of which is incorporated by reference.

BACKGROUND

Trust is the cornerstone for all transactions among parties. In enterprises, transaction management software platforms are siloed, limiting or prohibiting altogether the ability of parties to share real-time, trustworthy data. If even some information can be shared, the authentication of the data can be administratively, logistically, and practically impossible. In addition, centralized enterprises face unprecedented security challenges in connection with information technology architecture. Capital investment oftentimes limits or eliminates opportunities to significantly modify or replace existing technology infrastructures to adopt innovative solutions.

What are needed, then, are systems and methods for a decentralized data authentication platform to coordinate trustworthy, fast, and secure interactions between identities, business partners, or parties in a workflow.

BRIEF SUMMARY

This Brief Summary is provided to introduce a selection of concepts in a simplified form that are further described below in the Detailed Description. One aspect of the disclosure may include a computer-implemented method. The computer-implemented method may include a computer-implemented method for creating authenticable data by creating decentralized identifiers (DID) for credentials. The method may include receiving, at a computer server, a credential. The method may include storing, in a first data storage, the credential. The method may include generating a credential DID document. The credential DID document may correspond to the credential. The credential DID document may include a link configured to provide data access to the credential in the first data storage and a hash of the credential. The method may include obtaining a first digital signature. The first digital signature may be verifiable via a first public cryptographic key. A first attesting DID document may include the first public cryptographic key. The method may include storing, in the first data storage, the first digital signature. The method may include modifying the first attesting DID document to include a link configured to provide data access to data stored at first location in the first data storage, and to include a hash of the data stored at the first location in the first data storage. The data stored at the first location in the first data storage may include the credential or the first digital signature. The method may include obtaining a verifiable credential. The verifiable credential may include the credential and the first digital signature.

Another aspect of the disclosure includes a system. The system may include a system for creating authenticable data. The system may include a data storage device that may include a data storage. The system may include a computer-readable storage medium that may include a plurality of executable instructions. The system may include at least one computer processor in data communication with the computer-readable storage medium. When executed by the at least one processor, the plurality of executable instructions may cause the at least one processor to: receive, at the at least one computer processor, a credential; store, in the data storage, the credential; and generate a credential DID document. The credential DID document may correspond to the credential. The credential DID document may include a link configured to provide data access to the credential in the data storage and a hash of the credential. When executed by the at least one processor, the plurality of executable instructions may cause the at least one processor to obtain a digital signature; store, in the data storage, the digital signature; modify the attesting DID document to include, a link configured to provide data access to data stored at a first location in the data storage and a hash of the data stored at the first location in the data storage. The data stored at the first location in the data storage may include at least one of the credential, or the digital signature. When executed by the at least one processor, the plurality of executable instructions may cause the at least one processor to obtain a verifiable credential. The verifiable credential may include the credential and the digital signature.

Another aspect of the invention includes a method. The method may include a computer-implemented method for creating authenticable data. The method may include receiving, at a computer server, a first credential. The method may include storing, in a data storage, the first credential. The method may include generating a first credential decentralized identifier (DID) document. The first credential DID document may include a hashlink configured to provide data access to the first credential. The method may include receiving, at the computer server, a second credential. The method may include storing, in the data storage, the second credential. The method may include generating a second credential DID document. The second credential DID document may include a hashlink configured to provide data access to the second credential. The method may include obtaining a verifiable credential, The verifiable credential may include the first credential and the second credential.

BRIEF DESCRIPTION OF THE DRAWINGS

FIG. 4 is a schematic block diagram illustrating one embodiment of a credential decentralized identifier (DID) document.

FIG. 5 is a front view illustrating one embodiment of a user interface of an attester device of the system of FIG. 1.

FIG. 6 is a front view illustrating one embodiment of a user interface of a verifier device of the system of FIG. 1.

DETAILED DESCRIPTION

Figure 1:
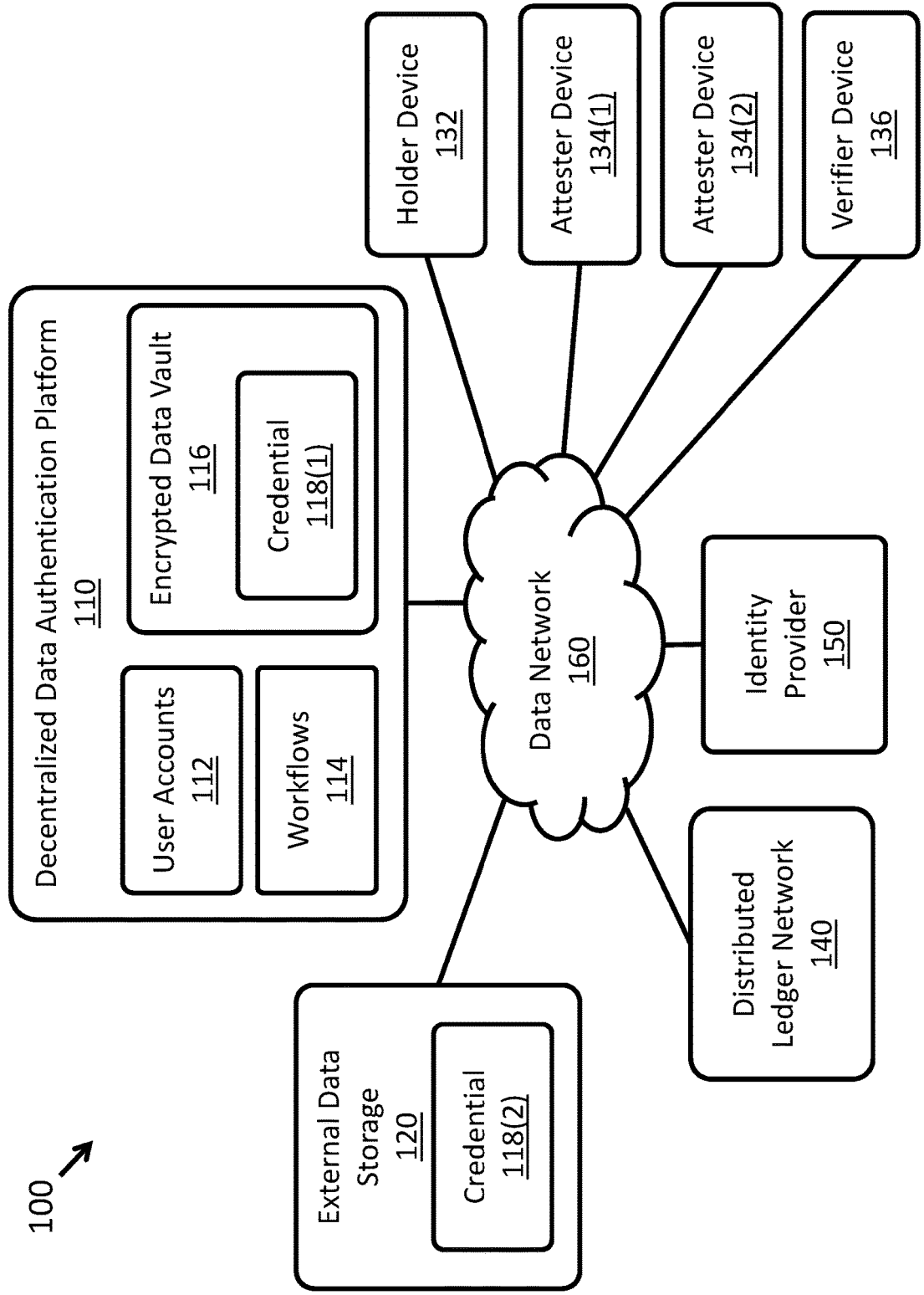
FIG. 1 is a schematic block diagram illustrating one embodiment of a system for a decentralized data authentication platform.

The present disclosure is directed to systems and methods for a decentralized data authentication platform. The platform coordinates trustworthy, fast, and secure interactions between identities, business partners, or parties such that parties are able to share and store data securely in any workflow. The platform utilizes cryptographic self-certifying identifiers linked to credentials and the platform securely stores the credential so that parties are able to cryptographically attest to or verify the credential.

The coordination, attestation, and authentication provided by the platform may take the form of a workflow facilitated by the platform. A workflow may include at least three portions: (1) a first user of the platform may provide a credential to the platform, (2) one or more second users of the platform may utilize the platform to attest to the veracity of the credential, and (3) a third user may verify the credential via the second user's/users' attestation(s). Some of the platform's functionality may include creating a cryptographic self-certifying identifier for the credential. This identifier may include information that cryptographically confirms that the credential has not been changed and that indicate the ways in which parties may view the information of the credential.

The platform's functionality may also include storing the credential in an encrypted data vault. The encrypted data vault may store the credential, but only allow certain information of the credential to be viewed or otherwise accessed by a specific user in or outside of a workflow.

As an example, a manufacturing company in the United States may purchase lumber that has been imported from a foreign country. Several parties may be interested in verifying information to validate the quality and characteristics of the lumber and the veracity of the lumber's chain of custody to reduce counterfeiting and comply with applicable anti-dumping laws. Information the parties may be interested in may include information about the lumber's source, applicable safety standard certifications, specifications, date of production, and the lumber's chain of custody after leaving the lumber mill. Not only the lumber's buyer, but also certain government agencies may want to confirm that the lumber is not from a country on a sanctions list and otherwise complies with legal regulations and anti-dumping laws. In addition, transportation companies may want to know the chain of custody of the lumber. This information related to the lumber may be contained in product origin and trade documents associated with the lumber.

At the beginning of a workflow, the lumber producer may create one or more structured trade documents and may provide information from each document through direct application programming interface (API) integration, a comma-separated values (CSV) file upload, or directly into a user interface of the decentralized data authentication platform. The platform may generate a credential from the provided information. The platform may store the credential in an encrypted data vault. The platform may generate a cryptographic self-certifying identifier (in the form of a decentralized identifier (DID) and corresponding DID document) for the credential that may include data indicating the location of the credential in the encrypted data vault. The platform may also anchor a reference to the credential or the DID document to a cryptographically secure distributed ledger such that a user may use the data on the distributed ledger to ensure that the credential has not been modified. In some cases, the lumber producer or other authorized parties may digitally sign the credential.

The lumber producer may deliver the lumber to a ground shipping carrier. The ground shipping carrier, when it receives the lumber, may confirm that it received the lumber from the lumber producer and that the received lumber is consistent with the credential in the encrypted data vault. The ground shipping carrier may also examine other trade documentation. If the ground shipping carrier determines that the lumber complies with the trade documentation and other workflow requirements, the carrier may attest to the credential by digitally signing it. The platform may anchor a reference to the ground shipping carrier's digital signature to the distributed ledger. The ground shipping carrier may transport the lumber from the lumber mill to a shipping company's ship or barge. The shipping company, and any other shipping carrier that transports the lumber may each confirm that the carrier received the lumber from the appropriate user in the supply chain and that the received lumber is consistent with the credential and digitally sign it via the platform. Each time a digital signature is captured, the platform may anchor the respective digital signature to the distributed ledger.

If the lumber is imported to the U.S., a government authority, subsequent logistics companies, or an end customer may verify the associated credential. This may include the government authority using the platform to confirm that the digital signatures are valid. By verifying the credential, verifying parties may confirm that the lumber complies with certain legal regulations or product specifications. The government authority or another entity in the supply chain may digitally sign a credential to confirm acceptance following inspection. Another ground transportation carrier may, using the platform, verify or attest to the credential and then deliver the lumber from the ship to the site of a manufacturer or other entity that will consume or otherwise use the lumber.

The recipient manufacturer may utilize the platform to verify the digital signatures of each party in the supply chain to confirm that the lumber was not tampered with at any point in its creation or shipment. The manufacturing company may also determine that the delivered lumber meets the specification, grade, quantity, and other requirements in the original order by confirming details in the associated credential. The manufacturing company now has at least one or more verifiable credentials with all of the necessary verified digital signatures of the applicable parties of the supply chain. The one or more verifiable credentials, including digital signatures, may be available for viewing by other parties, as authorized by the manufacturing company, such that other parties can also verify information about the lumber. For example, another government agency may view the verifiable credential to determine regulatory compliance long after the lumber has been received by the manufacturing company. In another example, the manufacturing company may sell a portion of the excess lumber to another manufacturing company, and the other manufacturing company can view associated verifiable credentials to know information about the lumber such as its origin, the parties with custody of the lumber in the supply chain, and that the lumber was determined to comply with certain legal requirements.

Conventional efforts to verify credentials often involve each party using its own customized computing system with its own database or other data storage to track and manage its own portion of the supply chain. This allows a party to modify its own data without indicating to other parties that any aspect of the data has changed. Centralized data custodianship makes it difficult for one party to view or verify information maintained by another party. In some cases, parties may generate a custom integration between the parties' systems to enable some data sharing capabilities, but this does not solve the problem of verifying or authenticating data shared between or among third parties where trust is not inherent to the relationship. Examples of this challenge are commonplace when looking at costly bilateral electronic data interchange (EDI)-to-EDI integrations between supply chain companies today. Multilateral relationship data sharing, particularly between new parties engaging to meet immediate demand, is not adequately supported by this current centralized model.

The systems and methods for a decentralized data authentication platform disclosed herein provide a way for users to provide credentials to the platform, for the platform to securely store the credentials, and for the platform to generate provable self-certifying identifiers (in the form of DID documents) for those credentials (including chains of credentials). The method of creating a DID document for each credential provided to the platform improves existing methods for several reasons. First, the credential DID document includes data that captures the state of the credential (e.g., in a hashlink of a service endpoint of the DID document) at the time that the user or holder of the credential provided the credential to the platform. This allows other users with access to the DID document to verify that the information contained within the credential is still the same as when the holder user provided the credential. Second, the DID document itself provides an immutable, secure history of the credential. This history, which may be recorded on an immutable distributed ledger, may show: the timing associated with the creation of the credential, the identity of the person or machine that created it, any subsequent changes or revocations, links to the location of the credential, or other relevant data. DID documents for credentials is an improvement over existing credentialing methods because the platform enables the credentials to be referenced across computer systems or networks and linked to other models, such as those provided by centralized identity providers. In other words, different supply chain management systems can reference the DID documents to determine whether a credential is verified or not, even if those systems include conventional centralized computer systems. This allows the platform to transmit structured, verifiable information between existing systems without significant capital investment. It also allows for enhanced product traceability within a supply chain or other practical application without risk of exposure or sensitive or proprietary data. Using DID documents to authenticate credentials enables information to be shared and authenticated between or among third parties where trust is not inherent or otherwise shared. The methods and platform described herein is an improvement over existing credentialing methods where data is organized based on rules or aggregated through various, disparate resources.

Furthermore, the authentication platform provides users the ability to attest to the veracity of the provided credentials via provable digital signatures, which the platform also securely stores. These digital signatures can be anchored to an immutable and secure distributed ledger to prevent modification of the credentials or digital signatures during or after the attesting users have digitally signed the credentials. Additionally, different parties can verify and attest to credentials without having to have custom, individual integrations with the different parties' supply chain management or technical infrastructure systems. For example, parties may store their credentials in their own data storage, but may still provide links to that storage to the platform so that other users may view the credentials securely. In another example, different users may obtain their DID documents from different identity providers, but these users can still participate in the same workflow on the platform.

As used herein, the term "decentralized" means that at least a portion of information or functionality is not controlled by a single party. Instead the decentralized information or functionality is distributed among several parties whose aggregate behavior affects the information or functionality. One example of a decentralized technology is a distributed ledger.

As used herein, the term "distributed ledger" may include a data storage of transactions replicated across and synchronized by multiple computers, called "nodes," in communication with each other. The nodes may synchronize the data of the distributed ledger, including which transactions are added to the ledger and in what order, using a consensus mechanism. The transactions may be cryptographically secured such that once a transaction is added to the distributed ledger, the transaction cannot be later modified. Basic encryption or cryptography principles—such a public key infrastructure, digital signatures, and other cryptographic technologies—underlie the application of distributed ledger technology. When a user adds a distributed ledger transaction, the user may digitally sign the transaction such that other parties can verify that the transaction did, in fact, originate from that user. One example implementation of a distributed ledger includes a blockchain.

As used herein, the term "decentralized identifier," abbreviated as "DID," may include a unique identifier that may not require a centralized registration authority to generate, access, or use. Instead, an entity may generate the DID on its own without the permission of a central authority. The DID may include a corresponding DID document, which may include information that describes how to interact with a subject of the DID and how to authenticate the subject's actions, characteristics, features, identity, status, or other information. For example, the subject of the DID may include a person, an organization, a computing device, a credential, a process, or some other type of subject. An entity may add the DID to a distributed ledger. The distributed ledger may be configured to allow other entities on the distributed ledger to view the DID.

The DID may include data indicating how to access the corresponding DID document. The relationship between the DID and the DID document can be considered similar to the relationship between a uniform resource location (URL) of a webpage and the webpage itself. The webpage's URL indicates what protocol to use to access the webpage (such as HTTP) and the location of the webpage on the Internet (example.com). Similarly, the DID indicates what protocol to use to interact with the DID document and the identity of the DID document. However, whereas an entity wishing to use a certain URL for a webpage must obtain permission from a central authority (i.e., the Internet Corporation for Assigned Names and Numbers (ICANN)), an entity wishing to use a certain identifier for a DID does not need to obtain permission from a central authority.

One example of a DID may include "did:example: abc123," where "did" indicates the scheme (i.e., indicates that this string of text is a DID), "example" is the DID method (i.e., indicates what type or implementation the DID document is), and "abc123" is the identifier that uniquely identifies the DID among all DIDs of the same method. One example of a DID method includes Element provided by Transmute Industries, Inc. of Austin, Tex., United States.

The DID document may include at least three portions: an ID value, authentication suites, and service endpoints, each explained below. The ID value may be the same as the identifier of the corresponding DID and may uniquely identify the DID document. Each authentication suite may include information that another user may use to authenticate the actions of the DID's subject such that the other user can know that the DID subject performed those actions and that the actions were not performed by a different user or fraudulently. An authentication suite may include a public key. The public key may correspond to a private key that the owner of the DID document controls (and which is stored in a secure location). A user may use the public key to authenticate a digital signature created using the corresponding private key.

The DID document may include one or more service endpoints. A service endpoint may include a network address where a service may operate on behalf of the DID document's subject. A service endpoint may enable trusted interactions with the DID subject. A service endpoint may include a URL indicating the location of a service where a user can securely interact with the DID subject. In one embodiment, a URL of a listed service endpoint may include the URL of a representational state transfer-ful (RESTful) API. In some embodiments, a service may be indicated in a DID document through other types of data, such as a generalized data interchange protocol (e.g., the extensible data interchange protocol).

As used herein, the term "credential" means information or data that can be or has been attested to or verified. The term "credential" may include information or data that has not been attested to, while the term "verifiable credential" means a credential that has been properly attested to. In some embodiments, in response to one or more entities attesting to the veracity of a credential, the credential may become a verifiable credential.

In one embodiment, a credential may include text information. The text information may include text that a user may enter into a text field or select from a drop down box in a user interface of the decentralized data authentication platform. For example, a user may enter "I am at least 18 years-old" in a text box or may select the number "18" from a drop down box corresponding to the attribute "Age" in a user interface, and the platform may store this data and allow another user (such as a school or a physician) to attest to the correctness of that information. Other text information may include information about lumber contained in the trade document in the example above. A credential may include a document. The document may include a real-world document, a computer file, or some other type of document. For example, a user may upload an image of the trade document of the example above to the platform, or a user may upload a portable data file (PDF) of a school transcript to the platform. A credential may include a link to information stored on a data storage external to the platform or an encrypted data vault associated with the platform. Attesting to or verifying the link may include attesting to or verifying information. A credential may be a text based representation of an executable process, sometimes referred to as a workflow, where both software and other entities may complete tasks according to a predetermined set of rules. A credential may not necessarily be a document attesting to an entity's qualifications, competence, or authority.

As used herein, the term "hashlink" may include a link to a location where data is stored and an integrity check built into or included with the link. The link may include a URL, and the integrity check may include a hash. The hash may include the hash of the data at the location indicated by the link. For example, the hash link "http://example.com/edv/credential123#e58a21fc" may link to data stored at http:// example.com/edv/credential123 and if a hash function runs on the data stored at that location, the hash obtained from the hash function should match the hash "e58a21fc." If the hashes do not match, then the data stored at the location of the link may have changed since the creation of the hash link, which may indicate that the data stored at the location is not true or authentic.

As used herein, the term "anchoring" means providing data in a distributed ledger transaction that links to data external from the distributed ledger such that external data can be proven authentic using the anchoring data. One example of an anchor may include a hashlink as discussed above. Anchoring a credential may comprise including, in a DID document service endpoint, a hashlink to the credential where the hash of the hashlink can be used to authenticate the credential stored in the external location.

As used herein, the terms "authentication," "authenticating," and similar terms, may include a variety of actions. For example, authentication may include the process or action of demonstrating something to be true, genuine, or valid. Authentication may include the process or action of verifying the identity of a user. Authentication may include the process or action of establishing the truth, accuracy, or validity of information.

As used herein, the term "attesting to the veracity of a credential" and similar terms may include authenticating the information contained within or otherwise provided by the credential. For example, a department of motor vehicles (DMV) may attest to the veracity of a driver license. This may include the DMV confirming that the information contained in the driver license (such as a name and the license number) is correct, or the DMV confirming that the DMV did, in fact, issue the driver license. In some cases attesting to a credential may include confirming that the credential is genuine only without confirming the correctness of the information contained in the credential.

As used herein, the term "verifying a credential" means the process of determining that a credential has been digitally signed by all the necessary entities in the applicable workflow of the platform, and that all the digital signatures are authentic. Once a user has verified a credential, the credential may be called a "verifiable credential." The credential is verifiable because any user with access to the credential, the digital signatures, and the public cryptographic keys corresponding to those digital signatures can verify the credential.

As used herein, the term "user" may include a user of the decentralized data authentication platform 110 (herein, "the platform 110"), which is discussed below in relation to FIG. 1. A user may include a person, an organization, or another type of entity. A user may have a user account on the platform 110.

In some embodiments, there may be at least three different types of users of the platform 110: a holding user, an attesting user, and a verifying user. As used herein, a "holding user" may include a user that provides a credential to the platform 110 in order for the credential to be attested to or verified. For example, in the lumber example, above, the lumber producer may be a holding user. As used herein, the term "attesting user" may include a user that attests to the veracity of the credential provided by the holding user. As used herein, the term "verifying user" may include a user that verifies the credential. A user may take on a different type at different points in time or on different workflows of the platform 110. For example, a user may act as a holding user on one workflow and may act as an attesting user on a different workflow. In all cases, a user may be a person or a machine implementing an automated process.

As used herein, the terms "determine" or "determining" may include a variety of actions. For example, "determining" may include calculating, computing, processing, deriving, looking up (e.g., looking up in a table, a database or another data structure), ascertaining, or other actions. Also, "determining" may include receiving (e.g., receiving information or data), accessing (e.g., accessing data in a memory, data storage, distributed ledger, or over a network), or other actions. Also, "determining" may include resolving, selecting, choosing, establishing, or other similar actions.

As used herein, the terms "provide" or "providing" may include a variety of actions. For example, "providing" may include generating data, storing data in a location for later retrieval, transmitting data directly to a recipient, transmitting or storing a reference to data, or other actions. "Providing" may also include encoding, decoding, encrypting, decrypting, validating, verifying, or other actions.

As used herein, the term "access," "accessing", and other similar terms may include a variety of actions. For example, accessing data may include obtaining the data, examining the data, or retrieving the data. Providing access or providing data access may include providing confidentiality, integrity, or availability regarding the data.

As used herein, the term "message" may include one or more formats for communicating (e.g., transmitting or receiving) information or data. A message may include a machine-readable collection of information such as an Extensible Markup Language (XML) document, fixed-field message, comma-separated message, or another format. A message may, in some implementations, include a signal utilized to transmit one or more representations of information or data.

As used herein, the term "user interface" (also referred to as an interactive user interface, a graphical user interface or a UI), may refer to a computer-provided interface including data fields or other controls for receiving input signals or providing electronic information or for providing information to a user in response to received input signals. A user interface may be implemented, in whole or in part, using technologies such as hyper-text mark-up language (HTML), a programming language, web services, or rich site summary (RSS). In some implementations, a user interface may be included in a stand-alone client software application configured to communicate in accordance with one or more of the aspects described.

As used herein, the term "modify" or "modifying" may include several actions. For example, modifying data may include adding additional data or changing the already-existing data. As used herein, the term "obtain" or "obtaining" may also include several types of action. For example, obtaining data may include receiving data, generating data, designating data as a logical object, or other actions. For example, obtaining a verifiable credential may include designating a credential and digital signatures of the credential.

Reference throughout this specification to "one embodiment," "an embodiment," "another embodiment," or similar language means that a particular feature, structure, or characteristic described in connection with the embodiment is included in at least one embodiment. Thus, appearances of the phrases "in one embodiment," "in an embodiment," "in some embodiments," and similar language throughout this specification may, but do not necessarily, all refer to the same embodiment, but mean "one or more but not necessarily all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. As used herein, the term "a," "an," or "the" means "one or more" unless otherwise specified. The term "or" means "and/or" unless otherwise specified.

FIG. 1 depicts one embodiment of a system 100. The system 100 may include a system for creating authenticable data. As an overview, the system 100 may include a decentralized data authentication platform 110. The platform 110 may include one or more user accounts 112. The platform 110 may include one or more workflows 114. The platform 110 may include an encrypted data vault (EDV) 116. The EDV 116 may store a credential 118(1). A user with a user account 112 on the platform 110 may use the platform 110 to create a workflow 114 that may allow a holding user to provide a credential (such as the credential 118(1)), allow one or more attesting users to attest to the veracity of the credential, and allow a verifying user to authenticate the credential.

The system 100 may include an external data storage 120. The external data storage 120 may include another credential 118(2). The system 100 may include a holder device 132, one or more attestation devices 134(1)-(2), and a verifier device 136. Each of these devices 132-136 may include a computing device that may provide access to the platform 110 and allow the devices 132-136 to use the functionality of the platform 110 for decentralized data authentication purposes.

The system 100 may include a distributed ledger network 140. The distributed ledger network 140 may include a network of nodes that host a distributed ledger, as has been described above. In some embodiments, the distributed ledger network 140 may be configured to facilitate attestation or authentication in a workflow 114 of the platform 110. The system 110 may include an identity provider (IDP) 150. An identity provider 150 may include software, a computer service, or a platform that may assist in generating, managing, or using a cryptographic self-certifying identifier (such as a DID and the corresponding DID document) to an entity.

The system 100 may include a data network 160. The data network 160 may provide data communication functionality between certain components of the system 100. The data network 160 may include a local area network (LAN), a wide area network (WAN), a cellular network, an Internet Service Provider (ISP), the Internet, or some other type of network. The data network 160 may include a wired connection or a wireless connection.

Further details about the system 100 are now provided. In one embodiment, the platform 110 may include one or more computing devices. A computing device may include a desktop computer, a laptop computer, an application server, a database server, a tablet computer, a mobile phone (including a smartphone), a wearable technology device (including a smartwatch or smart glasses), or some other computing device. The one or more computing devices. A computing device may include one or more computer processors, data storage (including volatile storage or persistent storage), an interface for communicating with other computing devices (such as a network interface or input/output interfaces). Persistent storage may include, for example, disk storage, a solid-state drive (SSD), flash memory, or other persistent storage devices. The persistent storage may include a file system, database, or other data storage implementations.

A computing device may include computer-readable instructions. The computing device may control executing the instructions in order to carry out functionality of the platform 110, such as carrying out a workflow 114. For example, the computer-readable instructions may include software that may be executable by one or more processors in order to carry out operations, functions, or other functionality of the computing device.

In some embodiments, the platform 110 may include a key management store (KMS). The KMS may include computer storage or functionality for generating, storing, exchanging or using cryptographic keys, such as public and private keys used in PKI-related functionality.

In some embodiments, the platform 110 may include one or more user accounts 112. A user account 112 may include information about the entity of the user account 112. The information may include a username, a password hash, contact information, or other information. A user may use its user account 112 to log into the platform 112 and perform workflow 114 functionality using the platform 110. In one embodiment, a user may include an organization that includes multiple user accounts 112 on the platform 110. The multiple user accounts 112 of an organization may correspond to individual members of that organization (e.g., employees, officers, etc.).

In some embodiments, a user account 112 may include a cloud wallet. The user's cloud wallet may be part of the platform's 110 KMS. The user's cloud wallet may store cryptographic data for the user. The cryptographic data may include public and private cryptographic keys or other data used for encryption, authentication, or other cryptographic functions. For example, the user may have a DID document, and the user's cloud wallet may store the private key corresponding to a public key contained within an authentication suite of the DID document. The platform 110 may unlock the cryptographic data for a user in response to the user authenticating with the platform 110, an identity provider 150, or another service. The user may use the cryptographic data stored in the cloud wallet to perform various functions on the platform such as digitally signing information, attesting to a credential 118, or other workflow 114 functionality.

The platform 110 may include one or more workflows 114. A workflow 114 may include a series of actions users of the platform 110 may complete in order to finish the workflow 114. A workflow 114 may include the platform 110-enabled process for obtaining a credential 118, one or more users of the platform 110 attesting to the credential, or a user of the platform 110 verifying the credential.

In some embodiments, a workflow 114 may be represented in a formal modeling system such as business process model or notation (BPMN) or as executable computer program code. A workflow 114 may include a verifiable credential. The workflow 114 including a verifiable credential may include the specific process that is used to generate verifiable credentials being a verifiable credential itself.

In one embodiment, a user of the platform 110 may generate a workflow 114. Generating the workflow 114 may include the user selecting which user/users (or their respective user accounts 112) may provide a credential 118, which user/users may attest to a credential 118, or an order that the users may provide the credential 118 or attest to the credential 118. Generating the workflow 114 may include configuring viewing permissions such that only certain users may view a credential 118 or attestation information associated with the credential 118.

The platform 110 may provide end-to-end visibility and access controls for users in relation to the occurrence of a workflow 114. The platform 110 may integrate with third-party systems (such as the external data storage 120 or the IDP 150) in order to store data or carry out certain workflow 114 functionality, described below. The platform 110 may carry out the one or more workflows 114 regardless of which identity provider 150 a user in the workflow uses, regardless of which data storage implementation (such as the EDV 116 or external data storage 120) the workflow 114 uses, or regardless of which distributed ledger network 140 the workflow 114 uses.

In one embodiment, the platform 110 may provide logging and reporting functionality. The platform 110 may provide the logging and reporting or may allow a third-party application to integrate with the platform 110. A third-party application may include GOOGLE Analytics provided by Google, LLC of Mountain View, Calif., United States, or may include another analytics, logging, and reporting application. In other embodiments, the platform 110 may provide secure messaging between user accounts 112, organizations, or other users on the platform 110. The platform 110 may provide governance permissions, immutable authentication logging, or business process management integrations.

In one embodiment, the EDV 116 may include a data storage that stores encrypted data. However, the data stored in the EDV 116 may be encrypted such that the provider of the EDV 116 (such as the platform 110) cannot decrypt the data with the permission of the data's owner. For example, a user of the platform 110 may use a public key to encrypt a document and store the encrypted document in the EDV 116. Because of the nature of PKI, only the private key can decrypt the encrypted document. The platform 110 may not have access to the user's private key, thus, even though the encrypted document is stored in the platform's EDV 116, the platform 110 cannot read the encrypted document. When the user wants to use the encrypted document, the user retrieves the encrypted document from the EDV 116 and decrypts it using the user's private key.

The system 100 may include a credential 118. As stated above, a credential may include information or data that can be or has been attested to or verified. A credential 118 may an internally stored credential 118(1), which may include information or data stored on the platform 110 (e.g., in the EDV 116). A credential may include an externally stored credential 118(2), which may include information or data stored externally from the platform 110(2) (e.g., in the external data storage 120).

In some embodiments, the credential's 118 information may be in the form of text information, a document, a link to data, a process, or other information as defined herein. The credential 118 may include unstructured information, semi-structured information, or structured information. Unstructured information may include a data object with unrestricted titles or fields. Semi-structured information may include one or more fields that are required or have limited, specified options for values. Structured information may include strictly defined, specified titles or fields. The credential 118 may include an unspecified expiration date, a conditional expiration, or a specified expiration. A conditional expiration may include that the credential expires if a condition becomes true. An example condition may include a DID document of the attesting user becoming revoked. A specified expiration may include a relative date (e.g., in 30 days) or a specified date (e.g., Jun. 30, 2020). In response to the expiration of a credential 118, the credential 118 may be revoked.

In some embodiments, the platform 110 may integrate with one or more external data storages 120. Different user accounts 112 or workflows 114 may utilize different external data storages 120. An external data storage 120 may include a data storage that may be external to the platform 110 and that the platform 110 may not operate or control. The external data storage 120 may store a credential 118(2). In one embodiment, the platform 110 may integrate with an external data storage 120 via an API. The API may allow the platform 110 to send information to the external data storage 120 (such as login information or information identifying the credential 118(2) or the location of the credential 118(2) in the external data storage 120), and in response, the external data storage 120 may retrieve the credential 118(2) and send it to the platform 110. Examples of an external data storage 120 may include ORACLE DB provided by Oracle International Corp. of Redwood City, Calif., United States; GOOGLE Cloud provided by Google, LLC of Mountain View, Calif., United States; AZURE provided by Microsoft Corp. of Redmond, Wash., United States, BOX provided by Box, Inc. of Redwood City, Calif., United States; DROPBOX provided by Dropbox, Inc. of San Francisco, Calif., United States; STORJ provided by Storj Labs, Inc. of Atlanta, Ga., United States; or an implementation of the InterPlanetary File System (IPFS), Orbit DB, or Swarm.

In some embodiments, the holder device 132, attester devices 134(1)-(2), or verifier device 136 may each include a computing device. Each device 132-136 may include data authentication software executable on the device 132-136. The data authentication software may be configured to enable data communication between the platform 110 and the devices 132-136. The data authentication software of the holder device 132 may provide a credential 118 to the platform 110. The data authentication software of the attester devices 134(1)-(2) may attest to the veracity of the credential 118. The data authentication software of the verifier device 136 may verify the credential 136. The data authentication software of each of the devices 132-136 may include the same software, but may use different portions of the software and different times. For example, the device 132 may include a holder device 132 at one point in time, and may include an attester device 134 at a later point in time. In other words, the same device 132-136 may act as a holder device, an attester device, or a verifier device at different times by utilizing different portions of the data authentication software of the device 132-136. The data authentication software may include a desktop application, a mobile application, a web browser, or some other type of software. The software of the platform 110 and the software of the device 132-136 may form a client-server relationship.

The data authentication software of the holder device 132 may be configured to allow a user of the holder device 132 to enter a credential 118 into a user interface of the software. For example, the user interface of the data authentication software may include text fields, the user may enter text into the text fields, and the software may send the inputted text to the platform 110 as the credential 118(1) to be stored in the EDV 116 of the platform 110. In another example, the holder device 132 may include a file stored in a data storage of the holder device 132, and the data authentication software may upload the file as the credential 118(1) to the platform 110 via the software in order to store the credential 118(1) in the EDV 116. In another example, the user of the holder device 132 may enter a link to the credential 118(2) on the external data storage 120 into the data authentication software of the holder device 132, and the holder device 132 may send the link to the platform 110 so that the platform 110 may access the credential 118(2), for example, via an API of the external data storage 120.

The data authentication software of the attester device 134 may be configured to receive a credential 118 from the platform 110 as part of a workflow 114 process and present the user of the attester device 134 with the credential 118. The user may examiner the credential and determine whether the credential is correct or authentic. If so, the user may use the data authentication software of the attester device 134 to attest to the veracity of the credential 118. For example, the data authentication software may digitally sign (or cause the platform 110 to digitally sign on the user's behalf) the credential 118 using a private key corresponding to a public key contained within the user's DID document. The platform 110 may store the digital signature in the EDV 116.

The data authentication software of the verifier device 136 may be configured to receive a credential 118 and one or more digital signatures associated with the credential 118 from the platform 110. The data authentication software may obtain the public keys associated with the digital signatures (for example, from the DID documents of the users who attested to the credential 118) and determine whether the digital signatures are valid. In response to the digital signatures being valid, the data authentication software may notify the user of the verifier device 136 that the credential is verified. For example, the data authentication software may provide a notification on a user interface of the data authentication software displayed on the verifier device 136.

In one embodiment, the platform 110 may integrate with one or more distributed ledger networks 140. Different user accounts 112 or workflows 114 may utilize different distributed ledger networks 140. The platform 110 may be compatible with multiple distributed ledger networks 140 and may use different distributed ledger networks 140 with different workflows 114. A distributed ledger may include the ETHEREUM blockchain provided by the Ethereum Foundation of Bern, Switzerland; any of the HYPERLEDGER implementations provided by the Linux Foundation of San Francisco, Calif., United States; Bitcoin; or other distributed ledger implementations.

In some embodiments, the platform 110 may integrate with one or more identity providers 150. Different user accounts 112 or workflows 114 may use different identity providers 150. An identity provider 150 may generate or maintain one or more DIDs or DID documents for a user. The identity provider 150 may facilitate a user in operating its respective DIDs or DID documents. Examples of identity providers 150 may include OKTA provided by Okta, Inc. of San Francisco, Calif., United States; ORACLE IDCS provided by Oracle International Corp. of Redwood City, Calif., United States, FIREBASE Auth provided by Google, LLC of Mountain View, Calif., United States; or uPort provided by uPort of Brooklyn, N.Y., United States. In some embodiments, an identity provider may include an entity that issues identification documentation, such as any school granting a diploma or certification or the department of motor vehicles providing a driver license.

Figure 2:
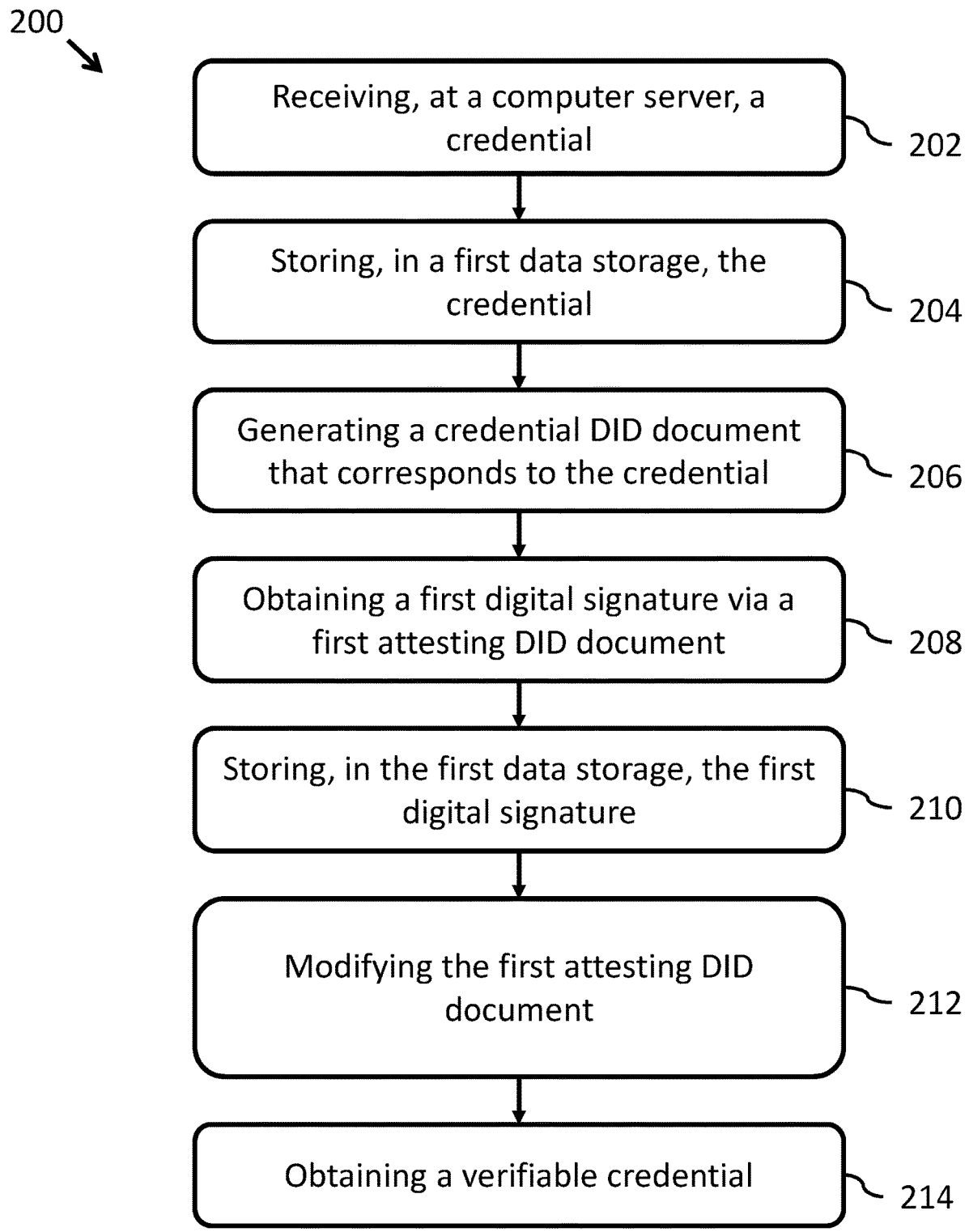
FIG. 2 is a flowchart diagram illustrating one embodiment of a method for a decentralized data authentication platform.

FIG. 2 depicts one embodiment of a method 200. The method 200 may include a computer-implemented method for creating verified data. The method 200 may include a workflow 114 that may be executed by the platform 110.

The method 200 may include receiving 202, at a computer server, a credential. The method 200 may include storing 204, in a first data storage, the credential. The method 200 may include generating 206 a credential decentralized identifier (DID) document. The credential DID document may correspond to the credential. The credential DID document may include a link configured to provide data access to the credential in the first data storage and a hash of the credential.

The method 200 may include obtaining 208 a first digital signature from a user. The first digital signature may be verifiable via a first public cryptographic key. A first attesting DID document may include the first public cryptographic key. The method 200 may include storing 210, in the first data storage, the first digital signature. The method 200 may include modifying 212 the first attesting DID document to include a link configured to provide access via a hash of the data at the first location in the first data storage. The data at the first location in the first data storage may include the credential or the first digital signature. The method 200 may include obtaining 214 a verifiable credential. The verifiable credential may include the credential and the first digital signature. It should be noted that while the method 200 discusses one credential 118 and a first digital signature, the method 200 is applicable to workflows 114 with multiple credentials 118 and more than two digital signatures.

Further details about the method 200 are now disclosed. In one embodiment, receiving 202, at the computer server, the credential may include the platform 110 receiving the credential 118. In one embodiment, the credential 118 may include text data input into a user interface in data communication with the platform 110. For example, a user of the holder device 132 (i.e., the holding user) may be logged into the user account 112 on the platform via the holder device 132. The holding user may use the holder device 132 to select a workflow 114 of the platform 110. The workflow 114 may cause the holder device 132 to display a fillable form. The holding user of the holder device 132 may input text data into the fillable form, and the holder device 132 may generate the credential 118 from the input text. The holder device 118 may send the credential 118 to the platform 110.

In another embodiment, the credential 118 may include a link to a second data storage, such as the external data storage 120. The link may be configured to provide data access to data, such as the credential 118(2), stored in the second data storage. The link may provide the data access via an API of the second data storage. Using the example from the previous paragraph, instead of presenting a fillable form to the holding user, the holder device 132 may display a fillable field to the holding user prompting the holding user to enter a link to the credential 118(2) on the external data storage 120. The holding user may input the link, and the holder device 132 may send the link to the platform 110 along with other data that may be used to access the credential 118(2) (e.g., login information).

In some embodiments, the credential 118 may include a file uploaded to the platform 110. Using the example in the previous two paragraphs, instead of presenting a fillable form or prompting the holding user for a link, the holder device 132 may prompt the holding user to select a file. The file may be located on the holder device 132 or may be located on another computing device in data communication with the holder device 132. The holding user may select a file, and the holder device 132 may upload the file to the platform 110 for storage in the EDV 116 as the credential 118(1).

Figure 3:
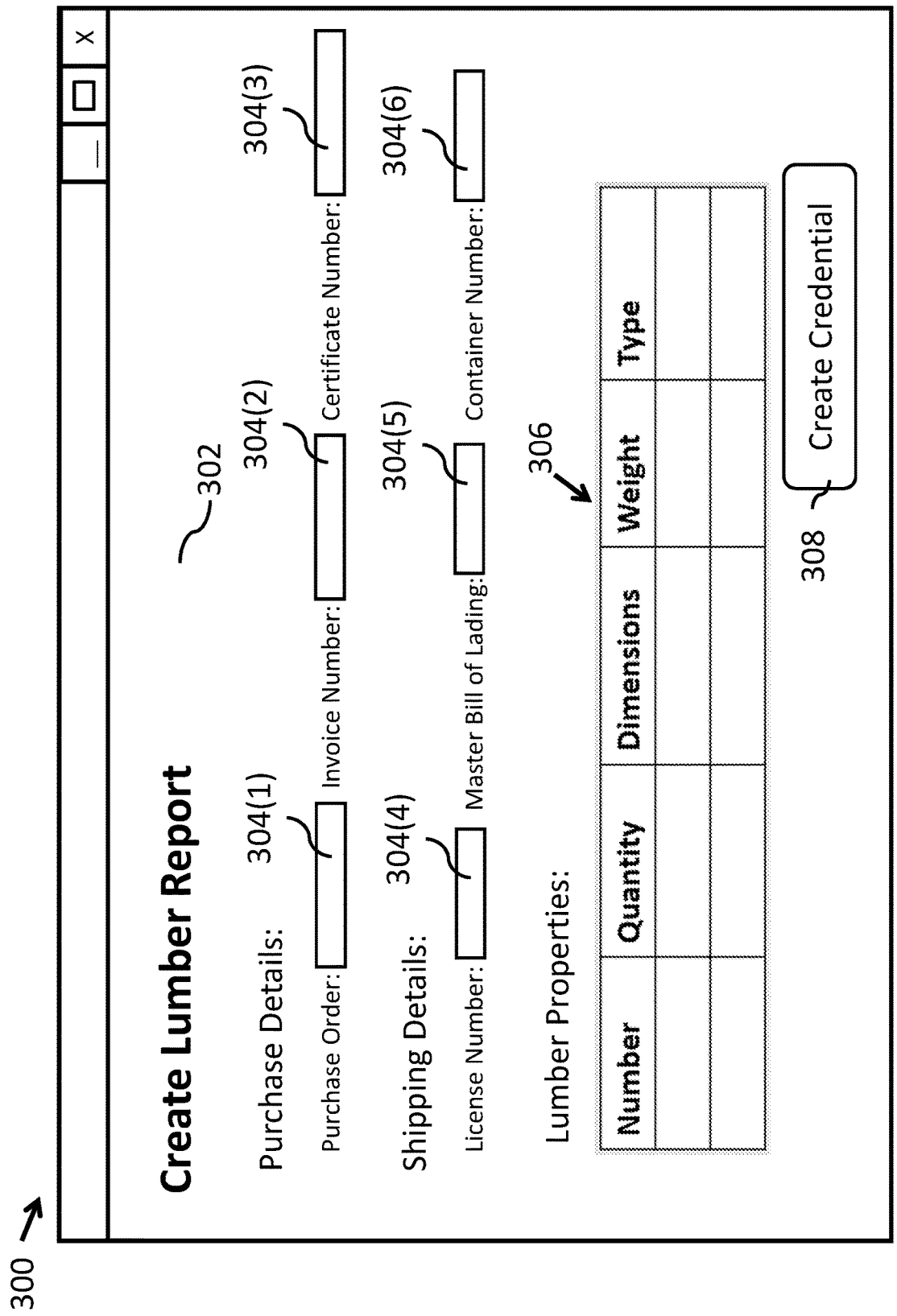
FIG. 3 is a front view illustrating one embodiment of a user interface of a holder device of the system of FIG. 1

FIG. 3 depicts one embodiment of a user interface 300 of a holder device 132. The user interface 300 may allow a holding user to enter credential information into the holder device 132, and the holder device 132 may generate the credential 118(1) from the entered information. The user interface 300 may include a title 302. The title 302 may indicate to the holding user that he or she is creating a credential 118(1). The title 302 may indicate what type of credential 118(1) is being created. The user interface 300 may include one or more input boxes 304(1)-(6). An input box 304 may include a text box, a drop down box, or other input-accepting field. The holding user may enter the information about the credential 118(1) into the input boxes 304(1)-(6). The holding user may also enter credential information into an input table 306. Once the user has entered the credential information, the user may use the "Create Credential" button 308, and the holder device 132 may create the credential 118(1).

In some embodiments, the first data storage may include the encrypted data vault 116. Storing 204, in the first data storage, the credential may include the platform 110 storing the credential 118(1) in the encrypted data vault 116. For example, the credential 118(1) may include the fillable form data input by the holding user into the holder device 132, the file uploaded by the holder device 132, or the link input by the holding user into the holder device 132, and the platform 110 may receive the credential 118(1) from the holder device 132 and store the credential 118(1) in the encrypted data vault 116. The platform 110 may associate the credential 118(1) with the workflow 114 such that the credential 118(1) can be quickly located. In some embodiments, storing 206 the credential may include storing metadata associated with the credential 118. The metadata associated with the credential 118? may include an expiration date, a description, notes, or other metadata.

In one embodiment, the subject of the credential DID document may include or correspond to a credential 118. The credential DID document may include, as part of its service endpoint data, a link configured to provide data access to the credential 118(1) in the encrypted data vault 116 or a link configured to provide access to the credential 118(2) in the external data storage 120. The credential DID document may include a hash of the credential 118.

FIG. 4 depicts one embodiment of a credential DID document 400. The DID document 400 may include the credential DID document that corresponds to the credential 118. The DID document 400 of FIG. 4 may correspond to a DID "did:example:credential123." The DID document 400 may include an ID 410. In the embodiment depicted in FIG. 4, the ID may be the same as the DID (i.e., "did:example:credential123"). The DID document 400 may include one or more authentication suites 420. An authentication suite 420 may include a string of text identifying the suite, a string of text identifying the type of authentication protocol, and cryptographic data used with the authentication protocol, such as a public key. The DID document 400 may include one or more service endpoints 430. A service endpoint 430 may include a string of text identifying the endpoint, a string of text identifying the type of endpoint, a link 432 to the credential that is the subject of the DID document 400, and a hash 434. The link 432 and the hash 434 may form a hashlink. In the embodiment of FIG. 4, the DID document 400 corresponds to a credential 118, the link provides the location of the credential 118, and the hash 434 may include a hash of the credential 118. A user may determine that the credential 118 has not been modified since the service endpoint 430 data was generated by following the link 432, running the credential 118 obtained via the link 432 through the same hashing algorithm to obtain a second hash, and comparing the hash 434 to the second hash. If the two hashes match, then the credential 118 has not been modified. If the two hashes do not match, then the user knows that the credential 118 may have been modified since the credential 118 was provided to the platform by the holder user. Such modified data can alert any user of potential malfeasance associated with the credential 118.

In some embodiments, generating 206 the credential DID document 400 may include storing the credential DID document 400 in a distributed ledger record. The distributed ledger record may be added to the distributed ledger of the distributed ledger network 140 via the consensus mechanism of the distributed ledger network 140. By storing the credential DID document 400 on the distributed ledger, a user can know whether the credential 118 that the service endpoint 430 of the credential DID document 400 points to has changed since the creation of the credential DID document 400. The user may include an attesting user, and if the credential 118(1) has changed, the attesting user may suspect that the credential may have been tampered with, and thus, may refuse to attest to the veracity of the credential. In some embodiments, generating 206 the credential DID document may include storing the credential DID document 400 in a database, such as a database of the platform 110 or a database of an external data storage 120.

In one embodiment, the method 200 may include sending a notification to a first attesting user. The notification may include a request for the first attesting user to attest to the veracity of the credential 118. The first attesting user may attest to the credential 118 by providing the first digital signature. The first attesting user may include a first attesting DID that includes the first public cryptographic key. The first attesting user may include the user of the first attester device 134(1).

In some embodiments, sending the first notification to the first attesting user may include the platform 110 sending a message that requests that the first attesting user attest to the veracity of the credential 118. The platform 110 sending the message to the first attesting user may include the platform 110 sending an email, a short message service (SMS) message, or other type of message to the first attesting user. The platform 110 may obtain contact information for the first attesting user from the user account 112 data of the first attesting user. In some embodiments, the platform 110 sending the message to the first attesting user may include the platform 110 sending a message on a messaging service internal to the platform 110, and the first attesting user may view the message using the data authentication software of the first attester device 134(1).

In one embodiment, the workflow 114 may specify the specific user account 112 of the first attesting user that must attest to the credential 118. In some embodiments, the workflow 114 may specify an organization that can attest to the credential 118, and multiple user accounts 112 associated with that organization can attest to the credential 118. The platform 110 may send the first notification to a specified user account 112 associated with the organization, and that user may forward the first notification to the desired user account 112 associated with the organization so that the desired user can attest to the credential 118. As an example of an organization with multiple users on the platform 110, a university may include multiple registrar's office employees. Each of these employees may have a user account 112 on the platform 110. A workflow 114 for attesting to diplomas from the university may allow any user account 112 associated with a registrar office employee of the university to attest to a diploma from the university, or the workflow 114 may specify which specific registrar office employee can attest to the diploma.

In one embodiment, obtaining 208 the first digital signature may include the computer platform 110 receiving the first digital signature from the first attester device 134(1). The platform 110 may send the credential 118(1) to the first attester device 134(1). The first attester device 134(1) may display the credential 118(1) to the first attesting user of the first attester device 134(1), or may provide a link to the credential 118(2) stored on the external data storage 120. The first attesting user may view the credential 118 via the first attester device 134(1) and determine whether the credential 118 is valid. If the first attesting user determines the credential 118 is valid, then the first attester device 134(1) may digitally sign the credential 118 to generate the first digital signature. The first attesting user may use a private key corresponding to a first attesting DID document, where the first attesting user may be the subject of the first attesting DID document. The first attester device 134(1) may send the first digital signature to the platform 110.

In one embodiment, the first attester device 134(1) may digitally sign the credential DID document. There may be several reasons for signing the credential DID document 400 instead of the credential 118 itself. In some embodiments, the credential 118 may include a large amount of data. Executing a digital signature process on the large credential 118 may take longer or may be less efficient. Also, transmitting the large amount of data to the first attester device 134(1) may consume a large amount of network bandwidth. Digitally signing the credential DID document 400 may eventually produce a verifiable credential that includes the credential 118 by reference. Digitally signing the credential 118 itself may eventually produce a verifiable credential that may include the credential 118 by value.

In one embodiment, the first attesting user may view the credential 118 and determine that the credential is not authentic. In response, the first attesting user may refuse to attest to the veracity of the credential 118. This may include the first attesting user not digitally signing the credential 118. Additionally or alternatively, the first attesting user may send a message (via the first attesting device 134(1)) to the platform 110, holding user, or other user that the credential 118 is not authentic.

FIG. 5 depicts one embodiment of a user interface 500 of an attester device 134. The user interface 500 may allow an attesting user to view the credential 118(1) on the attester device 134, and the attester device 134 may generate a digital signature for the credential 118(1). The user interface 500 may include a title 502. The title may indicate that the attesting user is attesting to a credential 118(1) and may indicate the type of credential 118(1). The user interface 500 may include one or more text boxes 504(1)-(6). A text box 504 may include information of the credential 118(1). A text box 504 may include the information that the holding user entered into the corresponding input box 304 on the user interface 300 of FIG. 3. The user interface 500 may include a table 506, which may include the information that the holding user entered into the corresponding table 306. The user interface 500 may include a "Sign Credential" button 508. The attesting user may use the button 508 and the attesting device 134 may digitally sign the credential 118(1) or cause the platform 110 to digitally sign the credential 118(1) on behalf of the attesting user using the attesting user's private key.

In some embodiments, obtaining 208 the first digital signature may include obtaining another type of proof. Other types of proofs may include a hash-based signature, a cryptographic accumulator, a zero-knowledge proof, or another type of proof. Data associated with the proof may be stored in the EDV 116 of the platform 110. Data referencing the stored proof data may be anchored to the distributed ledger by modifying the first attesting DID document to link to the stored proof data.

In some embodiments, storing 210 the first digital signature may include the platform 110 storing the first digital signature in the EDV 116. The platform 110 may associate the first digital signature with the credential 118(1) or with the workflow 114 such that the first digital signature can be quickly located.

In one embodiment, storing 210 the first digital signature may include storing a Javascript Object Notation-Linked Data (JSON-LD) Activity. The JSON-LD Activity may be digitally signed by the first attesting user. The JSON-LD Activity may include data about attesting to the credential 118 (e.g., the users involved, information in the credential, links to files, metadata, or other data). The first attesting user or the workflow may configure which user accounts 112 have access to which portions of the JSON-LD Activity.

In some embodiments, the method 200 may include modifying 212 the first attesting DID document. Modifying the first attesting DID document may include including the link that is configured to provide access to data at a first location on the first data storage and including the hash of the data at the first location in the first attesting DID document. The data at the first location on the first data storage may include the credential 118(1) or may include the first digital signature stored in the EDV 116. In one embodiment, modifying 212 the first attesting DID document may include updating the first attesting DID document to include a service endpoint that includes the link and the hash. As an example, the first attesting user may use the first attester device 134(1) to digitally sign the credential 118(1) and obtain the first digital signature. The first attester device 134(1) may also obtain a hash of the first digital signature. The first attester device 134(1) may send the first digital signature to the platform 110. The platform 110 may store the digital signature in the EDV 116. The platform 110 may provide a link to the first digital signature in the EDV 116 to the first attester device 134(1). The first attester device 134(1) may generate a distributed ledger transaction that updates the first attesting DID document to includes, in its service endpoints, the link and the hash.

Some workflows 112 may require multiple users to attest to a credential 118. Thus, in one embodiment, the method 200 may include obtaining a second digital signature from a second attesting user. The second attesting user may include a second attesting DID document. In some embodiments, the method may include similar steps to the steps 208 through 212 for the second attesting user. However, the second digital signature may include a digital signature of the credential only or the credential and one or more already-obtained digital signatures from previous attesting users. For example, obtaining the second digital signature may include appending the first digital signature to the credential and digitally signing the combined credential and appended first digital signature. By having subsequent attesting users digitally sign the credential and previous attesting user's digital signatures (which may all be stored in the EDV 116), the workflow 114 may obtain a chain of digital signatures that may help demonstrate that the credential 118 and the digital signatures have not changed since being generated and stored. In some embodiments, multiple attesting users may use a zero knowledge proof, a hash-based set inclusion or exclusion proof (e.g., a Merkle tree or Merkle-Patricia tree), a cryptographic accumulator, a Carenisch-Lysyanskaya (CL) signature to provide multi-user attestation of the credential 118.

In some embodiments, obtaining a digital signature (for example, as part of the obtaining 208 the first digital signature, or obtaining the second digital signature) may include the platform 110 receiving the digital signature from an attester device 134 (in which case, the digital signing may occur at the attester device), the platform 110 receiving the digital signature from the identity provider 150 (in which case, the digital signing may occur at the identity provider 150), or the platform 110 receiving an instruction from the attester device 134(1)-(2) to perform the digital signing using the attesting user's private cryptographic as stored and managed by the KMS of the platform 110 (in which case, the digital singing may occur on the platform 110).

The method 200 may include obtaining 214 the verifiable credential. The verifiable credential may include the credential 118 that has been attested to be the necessary users in the applicable workflow 118. The verifiable credential may include the credential DID document 400 corresponding to the credential 118. The verifiable credential may include the one or more digital signatures of the attesting users. The verifiable credential may include the distributed ledger data linking to the credential 118, the credential DID document, or the digital signatures. In some embodiments, the verifiable credential may provide data access to the credential 118 by reference or by value.

In one embodiment, obtaining 214 the verifiable credential may include generating a verifiable credential DID document. The verifiable credential DID document may correspond to the verifiable credential. The verifiable credential DID document may include a link configured to provide data access to the verifiable credential in the first data storage and a hash of the verifiable credential. The platform 110 may generate the verifiable credential DID document. Generating the verifiable credential DID document may include generating the verifiable credential DID document on a distributed ledger via one or more distributed ledger transactions.

FIG. 6 depicts one embodiment of a user interface 600 for a verifier device 136. The user interface 600 may allow a verifier user to view verifiable credential information on the verifier device 136. The user interface 600 may include a title 602. The title 602 may indicate that the verifier user is viewing a verifiable credential and may indicate the type credential being viewed. The user interface 600 may include one or more text boxes 604(1)-(6). A text box 604 may be similar to a text box 504 of the user interface 500 of FIG. 5. The user interface 600 may include a table 606, which may be similar to the table 506 of the user interface 500. The user interface 600 may include a list 608 of attesting users. The list 608 of attesting users may include a list of attesting users that attested to the credential 118(1) by digitally signing the credential 118(1) in order to turn the credential 118(1) into the verifiable credential. The user interface 600 may include a "View Signatures" button 610. The button 610 may allow the verifier user to view the digital signatures of the attesting user or view other information associated with the attesting users' attestation of the credential 118(1).

In some embodiments, a user of the platform 110 may configure viewing access to the credential 118 or the verifiable credential. The user that may configure access may include the user that created the workflow 114, an administrator or owner of the workflow 114, the holding user that provided the credential 118, or another user. For example, the user may configure viewing access such that any user account 112 of the platform 110 can view the credential 118 or verifiable credential. The user may configure viewing access such that only selected user accounts 112 may have viewing access. The selected user accounts 112 may include the user accounts 112 of the attesting users, user accounts 112 belonging to a selected organization, or specific user accounts 112 selected by user. The user may configure viewing access such that only certain portions of the credential 118 or verifiable credential are viewable. Other viewing configurations for the information can be used. The user may change the viewing configurations for the information at different times (e.g., before the information has been attested to, after attestation, or at another time).

As an example of viewing configurations, a holder user may configure a credential 118 with viewing access such that only attesting users in the workflow 114 can view it. The holder user may also configure same credential 118 with viewing access that once the credential 118 becomes a verifiable credential, the verifiable credential is viewable by any user on the platform 110.

In some embodiments, the platform 110 may enforce viewing permissions on a user that attempts to follow a hashlink and may prevent a user that does not have permission to view data associated with a certain workflow 114. In other embodiments, access to the hashlink may be protected by the platform 110 and controlled by database rules or authentication with the platform 110 or an identity provider 150. For example, the distributed ledger network 140 storing transaction data with the hashlink may be included a permissioned distributed ledger, and the platform 110 may only allow specified users to view certain portions of the ledger. The platform 110 may determine who has access to which parts of the ledger via the rules stored in a data storage of the platform 110.

In some embodiments, a workflow 114 may comprise "non-attestation," where a user does not attest to the veracity of the credential 118. In such a case, the method 200 may not include the steps 208-212. For example, a holding user may upload an image of the holding user's driver license to the platform 110 as a credential 118(1). However, the workflow 114 may not be configured to have a user attest to the driver license. Thus, the driver license may remain unattested. However, the platform 110 may still generate 206 the credential DID document 400 corresponding to the driver license. This may allow other users to determine if the uploaded driver license has changed since the holding user provided it to the platform 110. In one embodiment, an attesting user may include the holding user. In other words, the holding user may provide the credential 118 to the platform 110, and then the holding user may digitally sign the credential 118 to attest to the veracity of the credential.

In some embodiments, the user who provided a credential 118, digital signature, or the verifiable credential may revoke the credential 118, digital signature, or verifiable credential. The user revoking the credential 118, digital signature, or verifiable credential may add a transaction to the distributed ledger network 140 indicating that the user's credential 118, digital signature, or verifiable credential is revoked. Revoking the credential 118 or digital signature may revoke one or more subsequent digital signatures of the verifiable credential. For example, a verifiable credential may have been attested to by first, second, and third attesting users in that order. The second attesting user may revoke that second attesting user's digital signature. In response, the platform 110 may revoke the digital signature of the third attesting user and the verifiable credential, but may not revoke the credential nor the first attesting user's digital signature.

Figure 7:
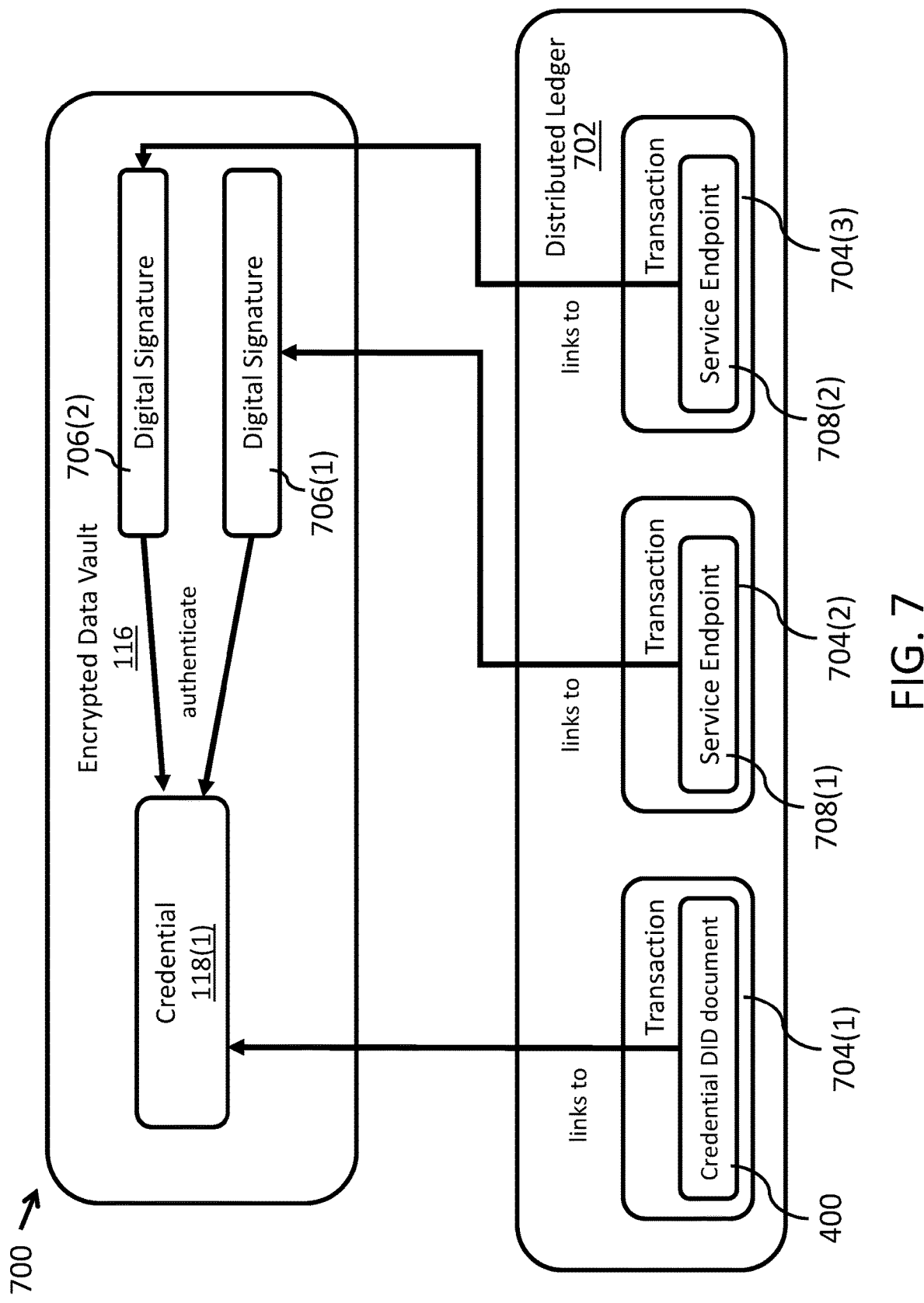
FIG. 7 is a schematic block diagram illustrating one embodiment of a system of a decentralized data authentication platform.

FIG. 7 depicts one embodiment of a system 700. The system 700 may include one or more components of the system 100 of FIG. 1 or one or more components discussed in the method 200 of FIG. 2. FIG. 7 depicts one embodiment of how the credential 118(1) or one or more digital signatures may be anchored on the distributed ledger.

In one embodiment, the system 700 may include the encrypted data vault 116. The system 700 may include a distributed ledger 702 of the distributed ledger network 140. The encrypted data vault 116 may store the credential 118(1). The platform 110 may generate the credential DID document 400 that corresponds to the credential 118(1). The credential DID document 400 may be stored on the distributed ledger 702 via a transaction 704(1). The credential DID document 400 may include a service endpoint 430 with a link 432 to the credential 118(1) in the EDV 116.

The EDV 116 may receive and store a first digital signature 706(1). The first attesting user may provide the first digital signature 706(1). The first attesting user may use the platform 110 or the first attesting device 134(1) to generate a transaction 704(2) on the distributed ledger 702. The transaction 704(2) may include data updating a service endpoint 708(1) of the first attesting DID document to include a link to the first digital signature 706(1). The EDV 116 may receive and store a second digital signature 706(2). The second attesting user may provide the second digital signature 706(2). The second attesting user may use the platform 110 or the second attesting device 134(2) to generate a transaction 704(3) on the distributed ledger 702. The transaction 704(3) may include data updating a service endpoint 708(2) of the second attesting DID document to include a link to the second digital signature 706(2). The first and second digital signatures 706(1)-(2) may authenticate the credential 118(1), and the credential 118(1) and the digital signatures 706(1)-(2) may form a verifiable credential. In some embodiments, the service endpoint data 708(1)-(2) may, instead, link to the credential 118(1).

Figure 8:
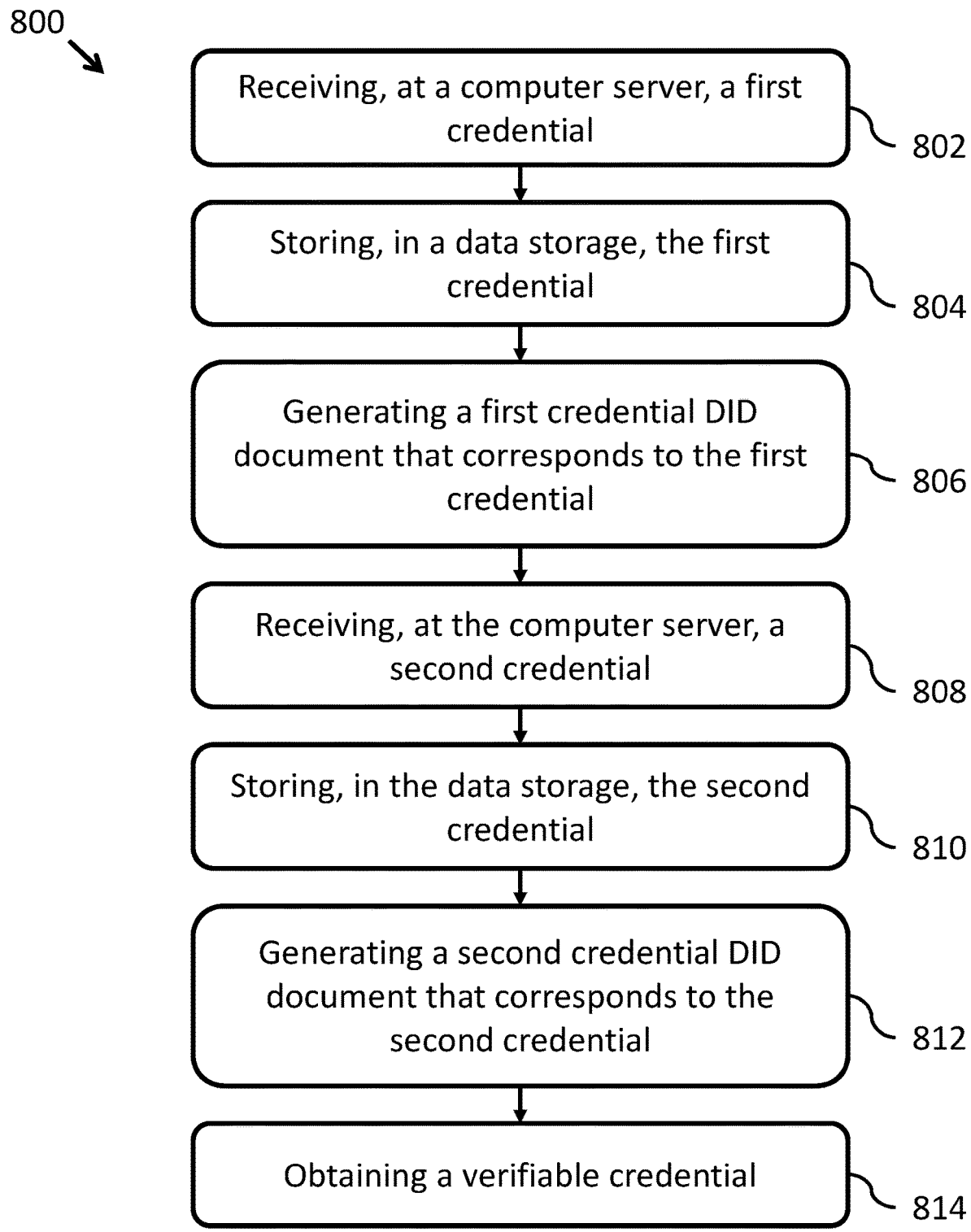
FIG. 8 is a flowchart diagram illustrating one embodiment of a method for a decentralized data authentication platform.

In some embodiments, a workflow 114 may be configured to have multiple credentials 118 attested to as part of the same workflow 114. Users participating in the workflow may provide credentials 118 to be attested to, or may attest to credentials 118, or both. For example, using the system 100 in the lumber example above, the lumber producer may provide the trade document to the platform 110 as a credential 118, and the first ground transportation carrier may attest to the trade document. The first ground transportation carrier may transport the lumber to a shipping company, and the shipping company may provide an additional transport document such as a bill of lading as a second credential 118. The first ground transportation carrier may attest to the veracity of the bill of lading. The shipping company may transport the lumber to the United States where a government agency may inspect the lumber and attest to the trade document, the bill of lading, or both. FIG. 8 depicts one embodiment of a method 800 for creating verifiable data in a workflow 114 with multiple credentials.

FIG. 8 depicts one embodiment of a method 800. The method 800 may include a computer-implemented method for creating authenticable data. The method 800 may include receiving 802, at a computer server, a first credential. The method 800 may include storing 804, in a data storage, the first credential. The method 800 may include generating 806 a first credential DID document The first credential DID document may include a hashlink configured to provide data access to the first credential. The method 800 may include receiving 808, at the computer server, a second credential. The method 800 may include storing 810, in the data storage, the second credential. The method 800 may include generating 812 a second credential DID document. The second credential DID document may include a hashlink configured to provide data access to the second credential. the method 800 may include obtaining 814 a verifiable credential. The verifiable credential may include the first credential and the second credential.

In some embodiments, receiving 802 the first credential or receiving 808 the second credential may be similar to the step of receiving 202 the credential of the method 200 of FIG. 2. The step of storing 804 the first credential or storing 810 the second credential may be similar to the step of storing 204 the credential of the method 200. The step of generating 806 the first credential DID document or generating 812 the second credential DID document may be similar to the step of generating 206 the credential DID document of the method 200. Obtaining 814 the verifiable credential may be similar to the step of obtaining 214 the verifiable credential of the method 200.

In one embodiment, the method 800 may further include obtaining a first digital signature. The first digital signature may include a digital signature of the first credential 118. A first attesting user may generate the first digital signature in a similar manner as discussed above in relation to step 208 of the method 200. The first digital signature may be verifiable by inputting the first credential 118 and the public key of the first attesting DID document into a digital signing function. The method 800 may also further include storing, in the data storage, the first digital signature. This may be similar to storing 204 the first digital signature of the method 200. This may also include modifying the first attesting DID document of the first attesting user to include a link, which may be similar to modifying 212 the first attesting DID document of the method 200.

In one embodiment, the method 800 may further include obtaining a second digital signature. The second digital signature may include a digital signature of the second credential 118. The second digital signature may include a digital signature of the first credential 118, the first digital signature, and the second credential 118. In some embodiments, the second digital signature may include a digital signature of some other combination of the first credential 118, the first digital signature, or the second credential 118. In some embodiments, the verifiable credential may include the first digital signature and the second digital signature in addition to the first and second credentials 118.

In one or more embodiments, obtaining 814 the verifiable credential may include generating a DID document corresponding to the verifiable credential. This DID document may be known as a verifiable credential DID document. The verifiable credential DID document may include, as part of its service endpoint data, links to the first and second credentials 118, links to the first and second digital signatures, links to the credential DID documents 400 of the first and second credentials 118, or links to other data. It should also be noted that while the method 800 discusses first and second credentials 118, the method 800 is applicable to workflows 114 with more than two credentials 118 or more than two digital signatures.

In some embodiments, a credential 118 may include a process. This credential 118 may link to information, another credential 118, or other data to indicate that the information, other credential 118, or other data went through the process associated with the credential 118. The credential 118 for the process may include a credential DID and credential DID document 400 as discussed above in relation to other credentials 118.

As an example of a process as a credential 118, a lumber-producing company may create a workflow 114 on the platform 110 for generating a certified trade document for a specific lumber-export requirement. Creating this workflow 114 may include generating a credential DID document 400 for the specific workflow 114, and a service endpoint 430 of the DID document 400 may link to the workflow 114 on the platform 110. This DID document 400 for the workflow may be referred to as the "workflow DID document."

Continuing the example, the lumber company may have a specific approved process for creating and signing a certified trade document. This process may include obtaining a signature from a quality assurance manager and a signature from a quality assurance specialist. The quality assurance manager may draft the trade document using test information retrieved from the lumber producer's EDI system. The quality assurance manager may provide the trade document's information as a credential 118 to the platform 110, and the platform 110 may generate a credential DID document 400 for the trade document credential 118. The quality assurance specialist may then view the trade document credential's 118 information and attest to the credential 118 via a digital signature. The quality assurance manager may then review the trade document credential's 118 information as a double-check and may also review the quality assurance specialist's digital signature to ensure the proper specialist provided the digital signature. The quality assurance manager may also digitally sign the trade document credential 118. The trade document credential 118 may now be a verifiable credential. The platform 110 may modify the workflow DID document to include a service endpoint that links to the trade document verified credential, signifying that the trade document certified credential was created as a result of the workflow 114 associated with the workflow DID document. Thus, a user may easily determine whether a credential 118 was created using a certain workflow 114 of the platform 110, or whether the credential 118 was generated using other methods. If a digital signature is missing from the trade document credential 118 or if the wrong user digitally signed the trade document credential, then the platform 110 may flag the trade document credential 110 so that the lumber producer can take corrective action.

The platform 110 features, including workflows 114 that provide for the receiving of credentials 118 (including credentials stored externally 118(2) from the platform 110), the generation of credential DID documents anchored to a distributed ledger, the attestation of the credentials 118 via digital signatures anchored to the distributed ledger, and the obtaining of a verifiable credential provide a technical solution to problems in the field of computerized supply chain management. One problem is the siloing of data of multiple parties. The systems and methods disclosed herein create decentralized, immutable records for each credential 118 that records the state of the subject of the credential 118 at the time the record is created. This allows multiple parties to track the state of the subject of the credential 118 in real-time, regardless of the party's internal logistics and supply chain management technology. Another problem is determining at which point a product on a supply chain may have changed (e.g., may have been damaged, may have spoiled, or may have been lost). By having multiple users attest to the state of the product using self-certifying cryptographic identifiers in a decentralized and cryptographically secure way, users are able to determine at which point in the supply chain something went wrong.

The systems and methods for a decentralized data authentication platform disclosed herein provide a way for users to link credentials 118 and digital signatures using DIDs that facilitates data sharing and referencing. Anchoring credentials 118 and digital signatures to distributed ledger records prevents modification of the data during or after the attestation process. Furthermore, different users can verify and attest to credentials 118 without having to have custom, individual integrations with the different users' supply chain management systems. The systems and methods are able to provide this trust and real-time tracking for a workflow 114 with any number of credentials 118 or attesting users. The workflows 114 may include a variety of steps in different sequences and points in time where a user may attest to a credential 118.

In some embodiments, the systems and methods described herein may not receive certification rules that specify compliance with certification criteria. Instead, the systems and method herein may create credential DID documents linking to credentials and receive attestation data from attestation devices 134 regarding the credential. There may be no certification authority because the workflows 114 may include a decentralized way to generate DID documents and attest to credentials without the need of an authority to do so.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

Furthermore, the described features, structures, or characteristics of the disclosure may be combined in any suitable manner in one or more embodiments. In the description contained herein, numerous specific details are provided, such as examples of programming, software, user selections, hardware, hardware circuits, hardware chips, or the like, to provide understanding of embodiments of the disclosure. One skilled in the relevant art will recognize, however, that the disclosure may be practiced without one or more of the specific details, or with other methods, components, materials, and so forth. In other instances, well-known structures, materials, or operations may not be shown or described in detail to avoid obscuring aspects of the disclosure.

These features and advantages of the embodiments will become more fully apparent from the description and appended claims, or may be learned by the practice of embodiments as set forth herein. As will be appreciated by one skilled in the art, aspects of the present disclosure may be embodied as an apparatus, system, method, computer program product, or the like. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer-readable medium(s) having program code embodied thereon.

In some embodiments, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated in one or more computer-readable medium(s).

In some embodiments, a module may include a smart contract hosted on a blockchain. The functionality of the smart contract may be executed by a node (or peer) of the blockchain network. One or more inputs to the smart contract may be read or detected from one or more transactions stored on or referenced by the blockchain. The smart contract may output data based on the execution of the smart contract as one or more transactions to the blockchain. A smart contract may implement one or more methods or algorithms described herein.

The computer program product may include a computer-readable storage medium (or media) having computer-readable program instructions thereon for causing a processor to carry out aspects of the present disclosure. The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium may include a portable computer diskette, a hard disk, a random access memory ("RAM"), a read-only memory ("ROM"), an erasable programmable read-only memory ("EPROM" or Flash memory), a static random access memory ("SRAM"), a hard disk drive ("HDD"), a solid state drive, a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations or block diagrams of methods, apparatuses, systems, algorithms, or computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flow chart diagrams included herein are generally set forth as logical flow chart diagrams. As such, the depicted order and labeled steps are indicative of one embodiment of the presented method. Other steps and methods may be conceived that may be equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Thus, although there have been described particular embodiments of the present invention of a new and useful tooling audit platform, it is not intended that such references be construed as limitations upon the scope of this invention.

What is claimed:

1. A computer-implemented method for creating authenticable data, comprising:
   receiving, at a computer server, a credential from a holding user;
   storing, in a first data storage, the credential;
   generating, for the credential of the holding user, a credential decentralized identifier (DID) document, wherein the credential DID document corresponds to the credential, wherein a subject of the credential DID document includes the credential, and wherein generating the credential DID document includes anchoring, to a distributed ledger,
      a first link configured to provide data access to the credential in the first data storage, and
      a first hash of the credential;
   obtaining, from a first attesting user, a first digital signature, wherein the first digital signature is verifiable via a first public cryptographic key, and wherein a first attesting DID document includes the first public cryptographic key;
   storing, in the first data storage, the first digital signature;
   modifying the first attesting DID document to include,
      a second link configured to provide data access to data stored at a first location in the first data storage, and
      a second hash of the data stored at the first location in the first data storage, wherein the data stored at the first location in the first data storage includes at least one of
         the credential, or
         the first digital signature,
   wherein modifying the first attesting DID document includes anchoring the second link and the second hash to the distributed ledger, wherein anchoring the second link and the second hash includes,
      generating a distributed ledger transaction that includes the second link and the second hash, wherein the distributed ledger transaction is digitally signed by a private key of the attesting user, and
      adding the distributed ledger transaction to the distributed ledger; and
   obtaining a verifiable credential, wherein the verifiable credential includes the credential and the first digital signature, and wherein a verifying user is capable of verifying that the verifiable credential is authentic via the credential DID document and the first digital signature.

2. The computer-implemented method of claim 1, wherein the first data storage comprises an encrypted data vault.

3. The computer-implemented method of claim 1, wherein receiving the credential from the holding user comprises at least one of:
   receiving, at the computer server, text data input by the holding user into a user interface in data communication with the server; or
   receiving, at the computer server, a third link to a second data storage, wherein the second data storage is external to the first data storage, and wherein the third link is configured to provide data access to data stored in the second data storage via an application programming interface (API) of the second data storage.

4. The computer-implemented method of claim 1, wherein receiving the credential comprises a receiving file uploaded to the server by the holding user.

5. The computer-implemented method of claim 1, wherein generating the credential DID document comprises storing the credential DID document on the distributed ledger.

6. The computer-implemented method of claim 1, further comprising sending a first notification to the first attesting user, wherein:
   the first notification includes a request for the first attesting user to provide the first digital signature; and
   the first attesting user corresponds to the first attesting DID document.

7. The computer-implemented method of claim 1, wherein the first digital signature comprises a digital signature generated via a digital signing function, wherein the digital signing function accepts the credential DID document and a private key corresponding to the first public cryptographic key of the attesting DID document.

8. The computer-implemented method of claim 1, further comprising:
   obtaining, from a second attesting user, a second digital signature, wherein
      the second digital signature is verifiable via a second public cryptographic key,
      a second attesting DID document includes the second public cryptographic key, and
      the second attesting DID document corresponds to the second attesting user;
   storing, in the first data storage, the second digital signature;
   storing, in a second distributed ledger record,
      a fourth link configured to provide data access to data stored at a second location in the first data storage, and
      a third hash of the data stored at the second location in the first data storage,
   wherein the data stored at the second location in the first data storage includes at least one of
      the credential, or
      the second digital signature.

9. The computer-implemented method of claim 1, further comprising:
   generating a verifiable credential DID document, wherein the verifiable credential DID document corresponds to the verifiable credential, and wherein the verifiable credential DID document includes
      a fifth link configured to provide data access to the verifiable credential in the first data storage, and
      a fourth hash of the verifiable credential.

10. A system for creating authenticable data, comprising:
    a data storage device, including a data storage;
    a computer-readable storage medium, including a plurality of executable instructions; and
    at least one computer processor in data communication with the computer-readable storage medium, wherein when executed by the at least one processor, the plurality of executable instructions causes the at least one processor to
       receive, at the at least one computer processor, a credential from a holding user,
       store, in the data storage, the credential,
       generate, for the credential of the holding user, a credential decentralized identifier (DID) document, wherein the credential DID document corresponds to the credential, wherein a subject of the credential DID document includes the credential, and wherein generating the credential DID document includes anchoring, to a distributed ledger, a first link configured to provide data access to the credential in the data storage, and
a first hash of the credential,
obtain, from a first attesting user, a digital signature, wherein the digital signature is verifiable via a public cryptographic key, and wherein an attesting DID document includes the public cryptographic key,
store, in the data storage, the digital signature,
modify the attesting DID document to include,
a second link configured to provide data access to data stored at a first location in the data storage, and
a second hash of the data stored at the first location in the data storage, wherein the data stored at the first location in the data storage includes at least one of the credential, or the digital signature,
wherein modifying the first attesting DID document includes anchoring the second link and the second hash to the distributed ledger, wherein anchoring the second link and the second hash includes,
generating a distributed ledger transaction that includes the second link and the second hash, wherein the distributed ledger transaction is digitally signed by a private key of the attesting user, and
adding the distributed ledger transaction to the distributed ledger, and
obtain a verifiable credential, wherein the verifiable credential includes the credential and the digital signature, and wherein a verifying user is capable of verifying that the verifiable credential is authentic via the credential DID document and the first digital signature.

11. The system of claim 10, wherein the credential comprises at least one of:
unstructured information;
semi-structured information; or
structured information.

12. The system of claim 10, wherein the credential comprises at least one of:
an unspecified expiration date;
a conditional expiration; or
a specified expiration.

13. The system of claim 10, wherein the data storage comprises an encrypted data vault.

14. The system of claim 10, wherein the digital signature comprises a digital signature generated via a digital signing function, wherein the digital signing function accepts the credential and a private key corresponding to the public key of the attesting DID document.

15. The system of claim 10, wherein the digital signature comprises a digital signature generated via a digital signing function, wherein the digital signing function accepts the credential and a private key corresponding to the public key of the attesting DID document.

16. A computer-implemented method for creating authenticable data, comprising:
receiving, at a computer server, a first credential from a first holding user;
storing, in a data storage, the first credential;
generating, for the first credential of the first holding user, a first credential decentralized identifier (DID) document, wherein a subject of the first credential DID document includes the first credential, and wherein generating the first credential DID document includes anchoring, to a distributed ledger, a hashlink configured to provide data access to the first credential;
modifying a first attesting DID document of a first attesting user by anchoring a first link to the distributed ledger, wherein the first link includes a link to a first digital signature, and wherein anchoring the first link includes,
generating a first distributed ledger transaction that includes the first link, wherein the first distributed ledger transaction is digitally signed by a private key of the first attesting user, and
adding the first distributed ledger transaction to the distributed ledger;
receiving, at the computer server, a second credential from a second holding user;
storing, in the data storage, the second credential;
generating, for the second credential, a second credential DID document, wherein a subject of the second credential DID document includes the second credential, and wherein the second credential DID document includes a hashlink configured to provide data access to the second credential;
modifying a second attesting DID document of a second attesting user by anchoring a second link to the distributed ledger, wherein the second link includes a link to a second digital signature, and wherein anchoring the second link includes,
generating a second distributed ledger transaction that includes the second link, wherein the second distributed ledger transaction is digitally signed by a private key of the second attesting user, and
adding the second distributed ledger transaction to the distributed ledger; and
obtaining a verifiable credential, wherein the verifiable credential includes
the first credential, and
the second credential,
wherein a verifying user is capable of verifying that the verifiable credential is authentic via the first credential DID document and the second credential DID document.

17. The computer-implemented method of claim 16, further comprising:
obtaining the first digital signature, wherein
the first digital signature includes a digital signature of the first credential,
the first digital signature is verifiable via a first public cryptographic key, and
wherein the first attesting DID document includes the first public cryptographic key; and
storing, in the data storage, the first digital signature.

18. The computer-implemented method of claim 16, further comprising:
obtaining the second digital signature, wherein
the second digital signature includes a digital signature of at least the second credential,
the second digital signature is verifiable via a second public cryptographic key, and
wherein the second attesting DID document includes the second public cryptographic key; and
storing, in the data storage, the second digital signature.

19. The computer-implemented method of claim 18, wherein the second digital signature includes the digital signature of the first credential, the first digital signature, and the second credential.

20. The computer-implemented method of claim 19, wherein:
the verifiable credential further includes the first digital signature and the second digital signature; and the verifying user is capable of verifying that the verifiable credential is authentic via the first credential DID document, the first digital signature, the second credential DID document, and the second digital signature.

\* \* \* \* \*